United States Patent
Sandberg et al.

(10) Patent No.: US 11,284,384 B2
(45) Date of Patent: Mar. 22, 2022

(54) DUMMY DOWNLINK TRANSMISSION ASSIGNMENTS FOR EXTENSION OF ON STATE OF DISCONTINUOUS RECEPTION (DRX) CYCLE

(71) Applicant: CommScope Technologies LLC, Hickory, NC (US)

(72) Inventors: Stuart D. Sandberg, Acton, MA (US); Ehsan Daeipour, Southborough, MA (US); Nandish Chalishazar, Nashua, NH (US)

(73) Assignee: CommScope Technologies LLC, Hickory, NC (US)

( * ) Notice: Subject to any disclaimer, the term of this patent is extended or adjusted under 35 U.S.C. 154(b) by 113 days.

(21) Appl. No.: 16/879,388

(22) Filed: May 20, 2020

(65) Prior Publication Data
US 2020/0374843 A1 Nov. 26, 2020

Related U.S. Application Data
(60) Provisional application No. 62/850,997, filed on May 21, 2019.

(51) Int. Cl.
*H04W 72/04* (2009.01)
*H04W 76/28* (2018.01)

(52) U.S. Cl.
CPC ......... *H04W 72/042* (2013.01); *H04W 76/28* (2018.02)

(58) Field of Classification Search
CPC ............................ H04W 72/042; H04W 76/28
See application file for complete search history.

(56) References Cited

U.S. PATENT DOCUMENTS

| | | |
|---|---|---|
| 9,380,466 B2 | 6/2016 | Eyuboglu et al. |
| 9,414,399 B2 | 8/2016 | Eyuboglu et al. |

(Continued)

FOREIGN PATENT DOCUMENTS

| | | |
|---|---|---|
| EP | 3269118 A4 | 9/2018 |
| KR | 20100124850 A | 11/2010 |

(Continued)

OTHER PUBLICATIONS

Ericsson, "DRX with short on-Duration and Wake-up signaling", 3GPP TSG-RAN WG2#103, Tdoc R2-1811627 Resubmission of R2-1810058. Aug. 2018, pp. 1 through 3, Gothenburg, Sweden.

(Continued)

*Primary Examiner* — Ronald B Abelson
(74) *Attorney, Agent, or Firm* — Fogg & Powers LLC

(57) ABSTRACT

One embodiment is directed wirelessly communicating with user equipment (UE) operating using discontinuous reception (DRX). When a rank for the UE has changed is determined and, in response when that happens, if an ON duration for a current DRX cycle for the UE will elapse during a current subframe is determined. In response to making such determination about the ON duration, a dummy assignment of resource blocks on a downlink shared channel is sent to the UE. The UE extends the ON duration of the current DRX cycle in response to the dummy assignment. If a channel quality indication (CQI) report has been made by the UE is determined and, in response thereto, a modulation and coding scheme (MCS) used for communicating with the UE is updated based on the reported rank and reported CQI. The dummy assignment is not made for communicating actual data to the UE.

20 Claims, 2 Drawing Sheets

(56) References Cited

U.S. PATENT DOCUMENTS

Figure 1:
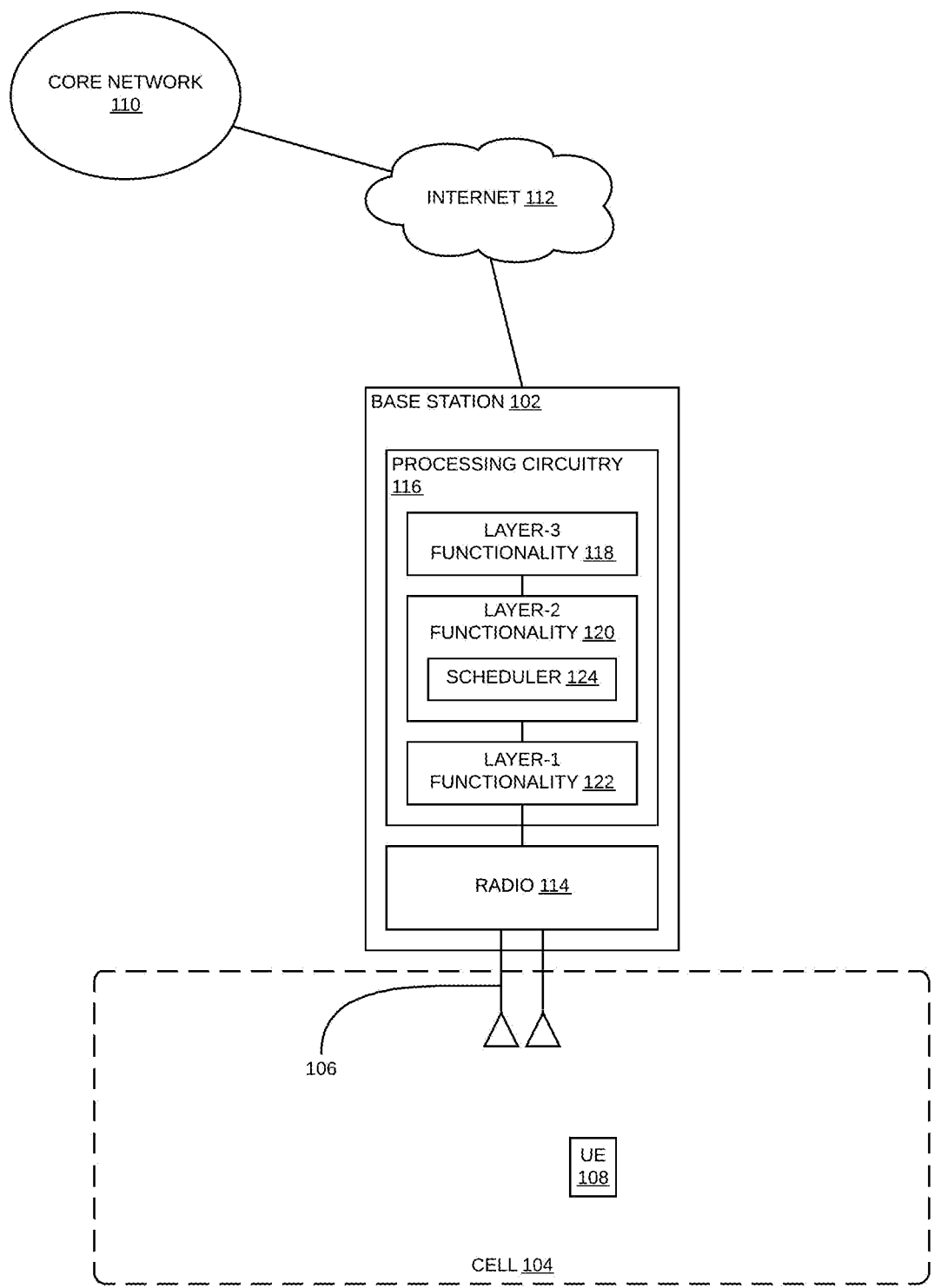

| | | |
|---|---|---|
| 9,794,791 B2 | 10/2017 | Hasarchi et al. |
| 9,867,052 B2 | 1/2018 | Sabat, Jr. et al. |
| 9,936,470 B2 | 4/2018 | Eyuboglu et al. |
| 9,998,310 B2 | 6/2018 | Barbieri et al. |
| 10,057,916 B2 | 8/2018 | Barabell et al. |
| 10,097,391 B2 | 10/2018 | Fertonani et al. |
| 10,355,895 B2 | 7/2019 | Barbieri et al. |
| 2016/0294531 A1 | 10/2016 | Loehr et al. |
| 2017/0265248 A1 | 9/2017 | Narasimha et al. |
| 2017/0373890 A1 | 12/2017 | Fertonani et al. |
| 2018/0287696 A1 | 10/2018 | Barbieri et al. |
| 2019/0007246 A1 | 1/2019 | Fertonani et al. |
| 2019/0116568 A1 | 4/2019 | Fertonani et al. |
| 2019/0208575 A1 | 7/2019 | Barbieri et al. |

FOREIGN PATENT DOCUMENTS

| | | |
|---|---|---|
| WO | 2016145371 A2 | 9/2016 |
| WO | 2017043767 A1 | 3/2017 |
| WO | 2017070635 A1 | 4/2017 |
| WO | 2018017468 A1 | 1/2018 |

OTHER PUBLICATIONS

International Searching Authority, "International Search Report and Written Opinion from PCT Application No. PCT/US2020/033803", from Foreign Counterpart to U.S. Appl. No. 16/879,388, filed Aug. 28, 2020, pp. 1 through 11, Published: WO.

Haberland et al., "Base Station in the Cloud", ITG Fachtagung Wien, Sep. 28, 2012, pp. 1-23, Alcatel-Lucent.

Zhu et al., "Virtual Base Station Pool: Towards a Wireless Network Cloud for Radio Access Networks", CF' 10, May 2010, pp. 1-10, Bertinoro, Italy.

DUMMY DOWNLINK TRANSMISSION ASSIGNMENTS FOR EXTENSION OF ON STATE OF DISCONTINUOUS RECEPTION (DRX) CYCLE

CROSS-REFERENCE TO RELATED APPLICATIONS

This application claims the benefit of U.S. Provisional Patent Application Ser. No. 62/850,997, filed on May 21, 2019, which is hereby incorporated herein by reference in its entirety.

BACKGROUND

Discontinuous reception (DRX) is used in Long Term Evolution (LTE) wireless networks to enable user equipment (UE) to enter a low-power state (also referred to as a "sleep" or "OFF" state) when the UE is inactive. A UE that is in the sleep state periodically exits the sleep state and re-enters the "normal" or "ON" state in order to maintain the connection to the serving base station (also referred to as an "Evolved Node B" or "eNodeB") and to check if the UE has been scheduled to receive data from the eNodeB. As used here, a "DRX cycle" refers to a single interval of time in which a UE enters and exits the ON state and the OFF state, and the "ON duration" refers to how long the UE remains in the ON state once it transitions from the OFF state to the ON state. The use of DRX extends the battery life of the UE. The shorter the ON duration relative to the DRX cycle, the greater the extension of the UE's battery life.

It may be desirable for an LTE eNodeB that serves a large number of UEs to use a large period (T_cqi) between successive channel quality indication (CQI) reports sent from each UE to the eNodeB and to have each UE periodically replace its CQI report with a channel rank indicator (RI) report for that UE. This can be done in order to conserve Physical Uplink Control Channel (PUCCH) resources when a large number of UEs are being served by the eNodeB.

However, if DRX is used for a UE and the ON duration for that UE is shorter than the CQI reporting period T_cqi used for that UE, it will not be possible for the UE to send both an RI report and a CQI report while in the ON state of a single DRX cycle. As a result, the eNodeB will not have an up-to-date CQI for the current channel conditions for the UE when the RI changes, which can result in a sluggish response when the UE wakes up to receive new downlink data. This is because the modulation and coding scheme (MCS) and the precoding matrix indicator (PMI) used for communicating with the UE may not be appropriate for the current channel conditions.

SUMMARY

One embodiment is directed to a base station configured to wirelessly communicate with user equipment (UE). The base station comprises a radio configured to wirelessly communicate with the UE and processing circuitry. The processing circuitry is configured to cause the base station to do the following for the UE if UE is operating using discontinuous reception (DRX): determine when a rank for the UE has changed; in response to determining that the rank for the UE has changed, determine if an ON duration for a current DRX cycle for the UE will elapse during a current subframe; in response to determining that the ON duration for the current DRX cycle for the UE will elapse during the current subframe, send to the UE a dummy assignment of resource blocks on a downlink shared channel, wherein the UE extends the ON duration of the current DRX cycle in response to the dummy assignment; determine if a channel quality indication (CQI) report has been made by the UE; and in response to determining that the CQI report has been made by the UE, update a modulation and coding scheme (MCS) and precoding matrix indicator (PMI) used for communicating with the UE based on the reported rank and reported CQI. The dummy assignment is not made for communicating actual data to the UE and does not use up any scheduling or PRB resources.

Another embodiment is directed to a method of wirelessly communicating with user equipment (UE). The method comprises, if the UE is operating using discontinuous reception (DRX): determining when a rank for the UE has changed; in response to determining that the rank for the UE has changed, determining if an ON duration for a current DRX cycle for the UE will elapse during a current subframe; in response to determining that the ON duration for the current DRX cycle for the UE will elapse during the current subframe, sending to the UE a dummy assignment of resource blocks on a downlink shared channel, wherein the UE extends the ON duration of the current DRX cycle in response to the dummy assignment; determining if a channel quality indication (CQI) report has been made by the UE; and in response to determining that the CQI report has been made by the UE, updating a modulation and coding scheme (MCS) used for communicating with the UE based on the reported rank and reported CQI. The dummy assignment is not made for communicating actual data to the UE.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a radio access network (RAN) system in which the techniques described here can be implemented.

Figure 2:
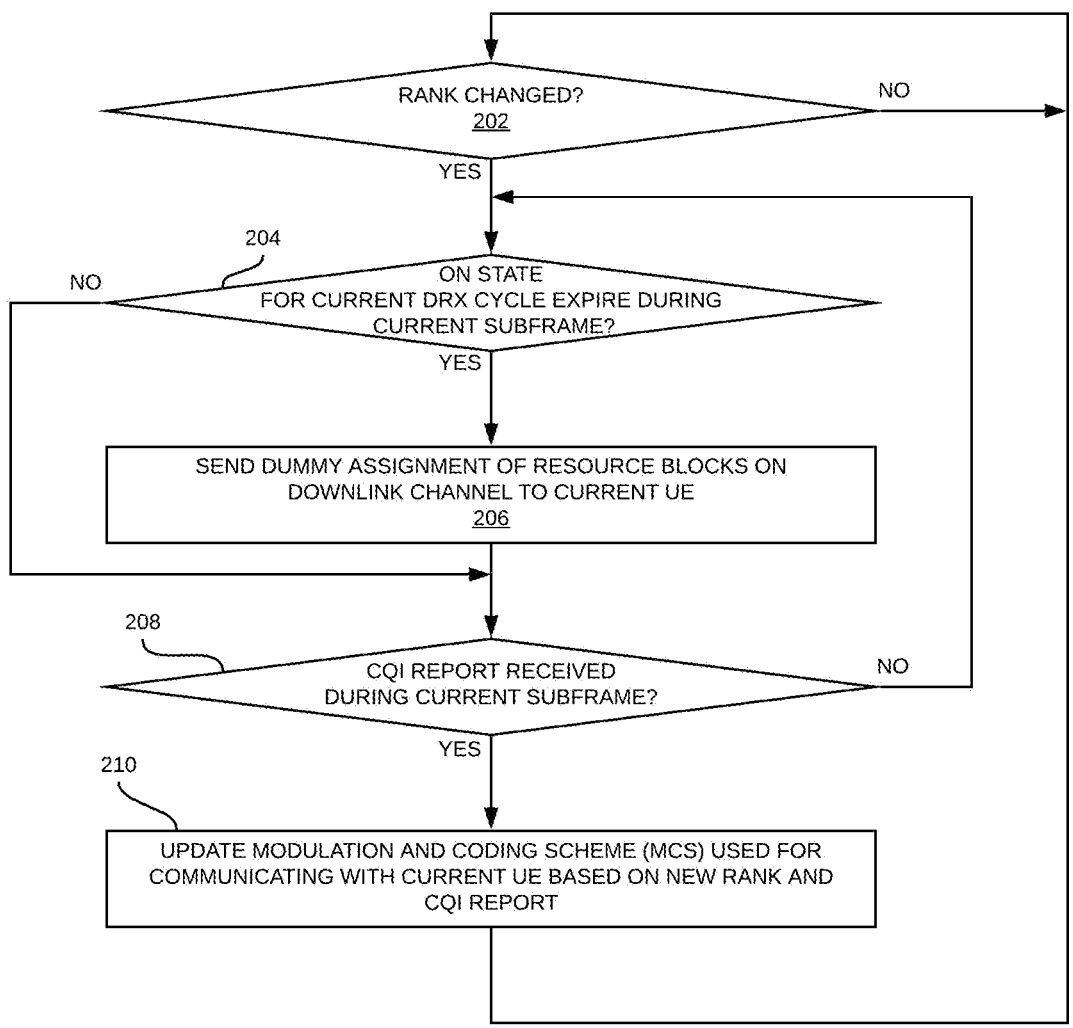

FIG. 2 comprises a high-level flowchart illustrating one exemplary embodiment of a method of extending the ON duration of a discontinuous reception cycle.

Like reference numbers and designations in the various drawings indicate like elements.

DETAILED DESCRIPTION

FIG. 1 is a block diagram illustrating one exemplary embodiment of a radio access network (RAN) system 100 in which the techniques described here can be implemented.

The RAN system 100 comprises one or more base stations 102 (also referred to here as "Evolved Node Bs" or "eNodeBs"). Each eNodeB 102 serves at least one cell 104 and includes or is coupled to one or more antennas 106 via which downlink RF signals are radiated to user equipment (UE) 108 and via which uplink RF signals transmitted by UEs 108 are received.

Each eNodeB 102 is coupled to a core network 110 of a wireless network operator over an appropriate back-haul and includes an appropriate network interface (not shown) to couple the eNodeB 102 to the back-haul. In the exemplary embodiment shown in FIG. 1, the Internet 112 is used for implementing at least a part of the back-haul between each eNodeB 102 and each core network 110. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, each eNodeB 102 implements an LTE Evolved Node B that is used to provide the user equipment 108 with mobile access to the wireless network operator's core network 110 to enable the user equipment 108 to wirelessly communicate data and voice (using, for example, Voice over LTE (VoLTE) technology).

Also, in this exemplary LTE embodiment, each core network 110 is implemented as an LTE Evolved Packet Core (EPC) 110 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Although LTE examples are described here, it is to be understood that the techniques described here are not intended to be limited to only use with LTE and can be used with other mobile communication protocols (possibly with appropriate modifications to account for differences in those other mobile communication protocols).

Each base station 102 can be implemented in various ways. For example, each base station 102 can be implemented using a traditional monolithic macro base station configuration, a microcell, picocell, femtocell or other "small cell" configuration, or a centralized, cloud or other distributed RAN architecture. For example, a base station 102 can be implemented using a centralized, cloud, or other distributed RAN architecture where a baseband unit (BBU) (also referred to here as a "controller" or "distributed unit" (DU)) and one or more remote radio heads (RRHs) (each of which is also referred to here as a "radio point" or "remote unit" (RU)). In such an example, the BBU is communicatively coupled to the associated one or more RRHs over a fronthaul network (for example, a switched Ethernet network). Moreover, various functional splits can be used between the functionality in the BBU and the functionality in each RRH. Each base station 102 can be implemented in other ways.

In the exemplary embodiment shown in FIG. 1, the eNodeB 102 also comprises at least one radio frequency (RF) module (also referred to here as a "radio") 114. Each radio 114 comprises circuitry that implements a RF transceiver for the eNodeB 102 and provides an interface to one or more antennas 106 coupled to the eNodeB 102. More specifically, in the exemplary embodiment shown in FIG. 1, each radio 114 interfaces with a respective two antennas 106.

In the exemplary embodiment shown in FIG. 1, the eNodeB 102 comprises processing circuitry 116 configured to implement, among other things, Layer-3 (L3) functionality 118, Layer-2 (L2) functionality 120, and Layer-1 (L1) functionality 122 for the wireless protocols used to provide wireless service to the UEs 108 via the cell 104. In particular, the L2 functionality 120 includes a scheduler 124.

The processing circuitry 116 (and the functionality described here as being included therein), as well as the eNodeB 102 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. The processing circuitry 116, and the eNodeB 102 more generally, can be implemented in other ways.

In this exemplary embodiment, the eNodeB 102 is configured to extend the ON duration of any UE 108 using discontinuous reception (DRX) after the eNodeB 102 receives a rank indicator (RI) report indicating that the rank has changed for that UE 108, if the ON duration for the current DRX cycle for the UE 108 would otherwise elapse before the next CQI opportunity. This is done so that the UE 108 will be in the ON state at the next opportunity for the UE 108 to make a CQI report. This CQI report will reflect the current channel conditions, which are associated with the changed rank reported in the most-recent RI report. The ON duration is extended by sending to the UE 108 a "dummy" assignment (defined below) of one or more resource blocks (RBs) on the Physical Downlink Shared Channel (PDSCH) (for example, by communicating appropriate downlink control information (DCI) to the UE 108 on the Physical Downlink Control Channel (PDCCH)). More than one dummy transmission may be required, and to minimize this number, the eNodeB will select the subframe for each dummy allocation so that the allocation is received by the UE in the subframe its DRX on cycle would otherwise expire. By extending the ON duration of the current DRX cycle, the UE 108 will be able to make, and the eNodeB 102 will be able to receive, a new CQI report during the same DRX cycle in which the change in rank is reported. As a result, the eNodeB 102 will be able to select (and use) for that UE 108 the modulation and coding scheme (MCS) and precoding matrix indicator (PMI) that is appropriate for the newly reported rank and the current channel conditions.

One example of how this is done is shown in FIG. 2.

FIG. 2 comprises a high-level flowchart illustrating one exemplary embodiment of a method 200 of extending the ON duration of a discontinuous reception cycle. The embodiment of method 200 shown in FIG. 2 is described here as being implemented using the eNodeB 102 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling. Moreover, one or more aspects of method 200 can be configurable or adaptive (either manually or in an automated manner). For example, various measurements or statistics can be captured and used to fine tune the method 200.

Method 200 is described here as being performed by the serving eNodeB 102 for each UE 108 that is currently using discontinuous reception. The particular UE 108 for which method 200 is described here as being performed is referred to here as the "current" UE 108.

Method 200 comprises determining if the rank for the current UE 108 has changed (block 202). The eNodeB 102 does this by checking each RI report it receives from the current UE 108 for any such change. It is noted that, when the current UE 108 transmits a RI report, it will be operating in the ON state and will remain in the ON state for the remainder of the ON duration period specified for the current UE 108.

Method 200 further comprises, when the rank for the current UE 108 has changed, determining if the ON state of the current DRX for the current UE 108 will expire during the current subframe (block 204) and, if that is the case, sending to the current UE 108 a "dummy" assignment of resource blocks on the Physical Downlink Shared Channel (PDSCH) (block 206). The resource blocks specified in the dummy assignment are also referred to here as "dummy" resource blocks. In this exemplary embodiment, the dummy assignment is sent to the current UE 108 via one or more LTE downlink control indicators (DCIs) on the Physical Downlink Control Channel (PDCCH). When the current UE 108 receives the dummy assignment, the current UE 108 treats the dummy assignment as a bona fide assignment and extends the ON duration of the current DRX cycle so that it is in the ON state for the remainder of the current subframe and will be in the ON state for, and attempt to receive and decode, the dummy RBs referred to in the assignment, and will remain in DRX on state for a number of subframes subsequently.

A dummy assignment is a "dummy" in the sense that it is not a bona fide assignment generated as a result of the scheduler 124 performing its normal scheduling processing but is instead generated only for the purpose of causing the current UE 108 to extend the ON duration of the current DRX cycle—both in response to receiving the dummy assignment and also in response to failing to successfully receive and decode the one or more dummy resource blocks specified in the dummy assignment. That is, the dummy assignment is not made for communicating actual data to the current UE 108, where "actual" data refers to data that is ultimately used by the current UE 108 for a purpose other than only causing the current UE 108 to extend the ON duration of the current DRX cycle. The dummy allocation does not use up any scheduler resources or PDSCH PRB resources, as described in the next paragraph.

In this exemplary embodiment, the scheduler 124 performs its normal PDSCH scheduling processing for the current subframe, independent of whether or not any such dummy assignments have been made for the current subframe. That is, any dummy assignments that have been made to any UEs 108 for the current subframe do not affect the PDSCH scheduling processing performed by the scheduler 124 or the actual, bona fide assignments made by the scheduler 124. The scheduler 124, as a result of performing its normal PDSCH scheduling processing for the current subframe, may make one or more bona fide assignments to one or more other UEs 108 of one or more of the dummy resource blocks referred to in the dummy assignment, in which case the eNodeB 102 will transmit data to those one or more UEs 108 on the PDSCH using those one or more resource blocks. Also, the scheduler 124, as a result of performing its normal PDSCH scheduling processing for the current subframe, may not make any bona fide assignments of any of the dummy resource blocks referred to in the dummy assignment to any UE 108 for the current subframe, in which case the eNodeB 102 will not transmit any data on the PDSCH during the current subframe using those one or more resource blocks.

Moreover, in some embodiments, the eNodeB 102 is configured to support intra-cell downlink frequency reuse, which involves the eNodeB 102 simultaneously transmitting different data to different UEs 108 on the PDSCH using the same resource blocks. In those embodiments where the eNodeB 102 is configured to support intra-cell downlink frequency reuse on the PDSCH, the scheduler 124 performs its normal PDSCH scheduling processing for the current subframe (which includes processing for using intra-cell downlink frequency reuse) independent of whether or not any such dummy assignments have been made for the current subframe.

Method 200 proceeds to block 208 after sending a dummy assignment to the current UE 108 or if the ON state of the current DRX cycle will not expire during the current subframe. For example, the current DRX cycle for the current UE 108 will not expire during the current subframe if the current UE 108 has received a bona fide assignment of RBs on the PDSCH for the current subframe. If the current UE 108 has received a bona fide assignment of RBs on the PDSCH for the current subframe, the UE 108 will already extend the ON duration of the current DRX cycle for the current subframe, if necessary, so that the UE 108 will be in the ON state when the RBs are scheduled to be transmitted to the current UE 108 on the PDSCH. Also, in some cases, if during a previous subframe, the current UE 108 received a dummy assignment of one or more dummy RBs on the PDSCH, the current UE 108 will have failed in attempting to receive and decode the one or more dummy RBs and, in response thereto, will have extended the ON duration of the current DRX cycle for a number of subsequent subframes in order to receive any retransmission of those one or more dummy RBs during those subsequent subframes. The UE will make a failed decoding attempt for each of the sequence of 4 re/transmissions associated with a dummy allocation. Hence with N subframes between transmissions, a dummy allocation extends DRX on for the UE by 3N subframes.

Method 200 further comprises determining if a CQI report from the current UE 108 is received during the current subframe (block 208) and, if it is, updating the MCS and PMI used for communicating with the current UE 108 based on the rank indicated in the RI report and the CQI report (block 210). If a CQI report from the current UE 108 is not received during the current subframe, method 200 proceeds to block 204 in order to further extend the ON duration of the current DRX cycle of the current UE 108 (if necessary) for the current UE 108 to make its next CQI report during the current DRX cycle.

It is important to note that after the ON duration of the DRX cycle of the current UE 108 has been extended in order for it to make a new CQI report and after it makes the new CQI report, the UE 108 will automatically revert to using the previously configured ON duration for the DRX cycle, without having the serving eNodeB 102 reconfigure the UE 108.

By performing method 200, the eNodeB 102 is able extend the ON duration of the DRX cycle of a UE 108 that has had its rank change so that the UE 108 can make a new CQI report during the same DRX cycle. As a result, the eNodeB 102 will be able to select (and use) for that UE 108 the MCS and PMI that is appropriate for the newly reported rank and the current channel conditions. Doing this avoids the reduced performance that otherwise may result from not appropriately updating the MCS and PMI for the UE 108 during the same DRX cycle in which the rank changed. By making a dummy assignment of RBs on the PDSCH to a UE 108 as described above, the eNodeB 102 can extend the ON duration of the DRX cycle of the UE 108 without having the eNodeB 102 explicitly reconfigure the UE 108 to use an extended ON duration. If instead of using the approach described above in connection with FIG. 2, the eNodeB 102 were to explicitly reconfigure the UE 108 to use an extended ON duration, the eNodeB 102 would need to send a first control message to the UE 108 to instruct it to perform such a reconfiguration and then the eNodeB 102 would need to send a second control message to the UE 102 to instruct it to change the ON duration back to its original setting. By using method 200, such control traffic and explicit reconfigurations of the UE 108 can be avoided.

Other embodiments can be implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a base station configured to wirelessly communicate with user equipment (UE), the base station comprising: a radio configured to wirelessly communicate with the UE; and processing circuitry configured to cause the base station to do the following for the UE if UE is operating using discontinuous reception (DRX): determine when a rank for the UE has changed; in response to determining that the rank for the UE has changed, determine if an ON duration for a current DRX cycle for the UE will elapse during a current subframe; in response to determining that the ON duration for the current DRX cycle for the UE will elapse during the current subframe, send to the UE a dummy assignment of resource blocks on a downlink shared channel, wherein the UE extends the ON duration of the current DRX cycle in response to the dummy assignment; determine if a channel quality indication (CQI) report has been made by the UE; and in response to determining that the CQI report has been made by the UE, update a modulation and coding scheme (MCS) and precoding matrix indicator (PMI) used for communicating with the UE based on the reported rank and reported CQI; and wherein the dummy assignment is not made for communicating actual data to the UE, and does not use up any scheduling or PRB resources.

Example 2 includes the base station of Example 1, wherein the downlink shared channel comprises a Physical Downlink Shared Channel (PDSCH).

Example 3 includes the base station of any of the Examples 1-2, wherein the dummy assignment is sent to the UE via one or more downlink control indicators (DCIs) on a Physical Downlink Control Channel (PDCCH).

Example 4 includes the base station of any of the Examples 1-3, wherein the UE extends the ON duration of the current DRX cycle so as to be in the ON state for the current subframe.

Example 5 includes the base station of any of the Examples 1-4, wherein the UE extends the ON duration of current DRX cycle in response to a failure to successfully receive and decode actual data transmitted to the UE using the resource blocks referred to the dummy assignment.

Example 6 includes the base station of any of the Examples 1-5, wherein the processing circuitry is configured to implement a scheduler, wherein the dummy assignment does not affect the scheduling performed by the scheduler for the downlink shared channel for the current subframe.

Example 7 includes the base station of Example 6, wherein the scheduler, as a result of scheduling for the downlink shared channel, makes one or more bona fide assignments, for the current subframe, to one or more other UEs of one or more of said resource blocks referred to in the dummy assignment for transmitting actual data to the one or more other UEs on the downlink shared channel.

Example 8 includes the base station of any of the Examples 6-7, wherein the scheduler, as a result of scheduling for the downlink shared channel, does not assign to any UE, for the current subframe, one or more of said resource blocks referred to in the dummy assignment and does not transmit any actual data on the downlink shared channel using the one or more of said resource blocks that are not assigned.

Example 9 includes the base station of any of the Examples 6-8, wherein the base station is configured to support intra-cell downlink frequency reuse on the downlink shared channel, wherein the scheduler schedules intra-cell downlink frequency reuse on the downlink shared channel for the current subframe, independent of the dummy assignment.

Example 10 includes the base station of any of the Examples 1-9, further comprising at least one controller and one or more radio points; wherein each radio point is associated with at least one antenna and remotely located from the controller; wherein each radio point is communicatively coupled to the controller; wherein the controller is communicatively coupled to a core network of a wireless service provider; wherein each radio point comprises a respective RF module; and wherein at least some of the processing circuitry is implemented in the controller.

Example 11 includes a method of wirelessly communicating with user equipment (UE), the method comprising: if the UE is operating using discontinuous reception (DRX): determining when a rank for the UE has changed; in response to determining that the rank for the UE has changed, determining if an ON duration for a current DRX cycle for the UE will elapse during a current subframe; in response to determining that the ON duration for the current DRX cycle for the UE will elapse during the current subframe, sending to the UE a dummy assignment of resource blocks on a downlink shared channel, wherein the UE extends the ON duration of the current DRX cycle in response to the dummy assignment; determining if a channel quality indication (CQI) report has been made by the UE; and in response to determining that the CQI report has been made by the UE, updating a modulation and coding scheme (MCS) used for communicating with the UE based on the reported rank and reported CQI; and wherein the dummy assignment is not made for communicating actual data to the UE.

Example 12 includes the method of Example 11, wherein the downlink shared channel comprises a Physical Downlink Shared Channel (PDSCH).

Example 13 includes the method of any of the Examples 11-12, wherein the dummy assignment is sent to the UE via one or more downlink control indicators (DCIs) on a Physical Downlink Control Channel (PDCCH).

Example 14 includes the method of any of the Examples 11-13, wherein the UE extends the ON duration of the current DRX cycle so as to be in the ON state for the current subframe.

Example 15 includes the method of any of the Examples 11-14, wherein the UE extends the ON duration of current DRX cycle in response to a failure to successfully receive and decode actual data transmitted to the UE using the resource blocks referred to the dummy assignment.

Example 16 includes the method of any of the Examples 11-15, wherein the dummy assignment does not affect scheduling for the downlink shared channel for the current subframe.

Example 17 includes the method of Example 16, wherein, as a result of scheduling for the downlink shared channel for the current subframe, one or more bona fide assignments are made, for the current subframe, to one or more other UEs of one or more of said resource blocks referred to in the dummy assignment for transmitting actual data to the one or more other UEs on the downlink shared channel.

Example 18 includes the method of any of the Examples 16-17, wherein, as a result of scheduling for the downlink shared channel for the current subframe, one or more of said resource blocks referred to in the dummy assignment are not assigned to any UE for the current subframe and no actual data is transmitted on the downlink shared channel using the one or more of said resource blocks that are not assigned to any UE for the current subframe.

Example 19 includes the method of any of the Examples 11-18, wherein the dummy assignment does not affect scheduling of intra-cell downlink frequency reuse on the downlink shared channel for the current subframe.

Example 20 includes the method of any of the Examples 11-18, wherein the method performed using a base station implemented using at least one controller and one or more radio points; wherein each radio point is associated with at least one antenna and remotely located from the controller; wherein each radio point is communicatively coupled to the controller; wherein the controller is communicatively coupled to a core network of a wireless service provider; wherein each radio point comprises a respective RF module; and wherein at least some of the method is implemented in the controller.

What is claimed is:

1. A base station configured to wirelessly communicate with user equipment (UE), the base station comprising:
    a radio configured to wirelessly communicate with the UE; and
    processing circuitry configured to cause the base station to do the following for the UE if UE is operating using discontinuous reception (DRX):
        determine when a rank for the UE has changed;
        in response to determining that the rank for the UE has changed, determine if an ON duration for a current DRX cycle for the UE will elapse during a current subframe;
        in response to determining that the ON duration for the current DRX cycle for the UE will elapse during the current subframe, send to the UE a dummy assignment of resource blocks on a downlink shared channel, wherein the UE extends the ON duration of the current DRX cycle in response to the dummy assignment;
        determine if a channel quality indication (CQI) report has been made by the UE; and
        in response to determining that the CQI report has been made by the UE, update a modulation and coding scheme (MCS) and precoding matrix indicator (PMI) used for communicating with the UE based on the reported rank and reported CQI; and
    wherein the dummy assignment is not made for communicating actual data to the UE, and does not use up any scheduling or PRB resources.

2. The base station of claim 1, wherein the downlink shared channel comprises a Physical Downlink Shared Channel (PDSCH).

3. The base station of claim 1, wherein the dummy assignment is sent to the UE via one or more downlink control indicators (DCIs) on a Physical Downlink Control Channel (PDCCH).

4. The base station of claim 1, wherein the UE extends the ON duration of the current DRX cycle so as to be in the ON state for the current subframe.

5. The base station of claim 1, wherein the UE extends the ON duration of current DRX cycle in response to a failure to successfully receive and decode actual data transmitted to the UE using the resource blocks referred to the dummy assignment.

6. The base station of claim 1, wherein the processing circuitry is configured to implement a scheduler, wherein the dummy assignment does not affect the scheduling performed by the scheduler for the downlink shared channel for the current subframe.

7. The base station of claim 6, wherein the scheduler, as a result of scheduling for the downlink shared channel, makes one or more bona fide assignments, for the current subframe, to one or more other UEs of one or more of said resource blocks referred to in the dummy assignment for transmitting actual data to the one or more other UEs on the downlink shared channel.

8. The base station of claim 6, wherein the scheduler, as a result of scheduling for the downlink shared channel, does not assign to any UE, for the current subframe, one or more of said resource blocks referred to in the dummy assignment and does not transmit any actual data on the downlink shared channel using the one or more of said resource blocks that are not assigned.

9. The base station of claim 6, wherein the base station is configured to support intra-cell downlink frequency reuse on the downlink shared channel, wherein the scheduler schedules intra-cell downlink frequency reuse on the downlink shared channel for the current subframe, independent of the dummy assignment.

10. The base station of claim 1, further comprising at least one controller and one or more radio points;
  wherein each of the radio points is associated with at least one antenna and remotely located from the controller;
  wherein each radio point is communicatively coupled to the controller;
  wherein the controller is communicatively coupled to a core network of a wireless service provider;
  wherein each radio point comprises a respective RF module; and
  wherein at least some of the processing circuitry is implemented in the controller.

11. A method of wirelessly communicating with user equipment (UE), the method comprising:
  if the UE is operating using discontinuous reception (DRX):
    determining when a rank for the UE has changed;
    in response to determining that the rank for the UE has changed, determining if an ON duration for a current DRX cycle for the UE will elapse during a current subframe;
    in response to determining that the ON duration for the current DRX cycle for the UE will elapse during the current subframe, sending to the UE a dummy assignment of resource blocks on a downlink shared channel, wherein the UE extends the ON duration of the current DRX cycle in response to the dummy assignment;
    determining if a channel quality indication (CQI) report has been made by the UE; and
    in response to determining that the CQI report has been made by the UE, updating a modulation and coding scheme (MCS) used for communicating with the UE based on the reported rank and reported CQI; and
  wherein the dummy assignment is not made for communicating actual data to the UE.

12. The method of claim 11, wherein the downlink shared channel comprises a Physical Downlink Shared Channel (PDSCH).

13. The method of claim 11, wherein the dummy assignment is sent to the UE via one or more downlink control indicators (DCIs) on a LTE Physical Downlink Control Channel (PDCCH).

14. The method of claim 11, wherein the UE extends the ON duration of the current DRX cycle so as to be in the ON state for the current subframe.

15. The method of claim 11, wherein the UE extends the ON duration of current DRX cycle in response to a failure to successfully receive and decode actual data transmitted to the UE using the resource blocks referred to the dummy assignment.

16. The method of claim 11, wherein the dummy assignment does not affect scheduling for the downlink shared channel for the current subframe.

17. The method of claim 16, wherein, as a result of scheduling for the downlink shared channel for the current subframe, one or more bona fide assignments are made, for the current subframe, to one or more other UEs of one or more of said resource blocks referred to in the dummy assignment for transmitting actual data to the one or more other UEs on the downlink shared channel.

18. The method of claim 16, wherein, as a result of scheduling for the downlink shared channel for the current subframe, one or more of said resource blocks referred to in the dummy assignment are not assigned to any UE for the current subframe and no actual data is transmitted on the downlink shared channel using the one or more of said resource blocks that are not assigned to any UE for the current subframe.

19. The method of claim 11, wherein the dummy assignment does not affect scheduling of intra-cell downlink frequency reuse on the downlink shared channel for the current subframe.

20. The method of claim 11, wherein the method performed using a base station implemented using at least one controller and one or more radio points;
  wherein each radio point is associated with at least one antenna and remotely located from the controller;
  wherein each radio point is communicatively coupled to the controller;
  wherein the controller is communicatively coupled to a core network of a wireless service provider;
  wherein each radio point comprises a respective RF module; and
  wherein at least some of the method is implemented in the controller.

* * * * *